May 29, 1934.  A. W. DU PONT  1,960,622
WAVE POWER PLANT
Filed Feb. 28, 1933  2 Sheets-Sheet 2
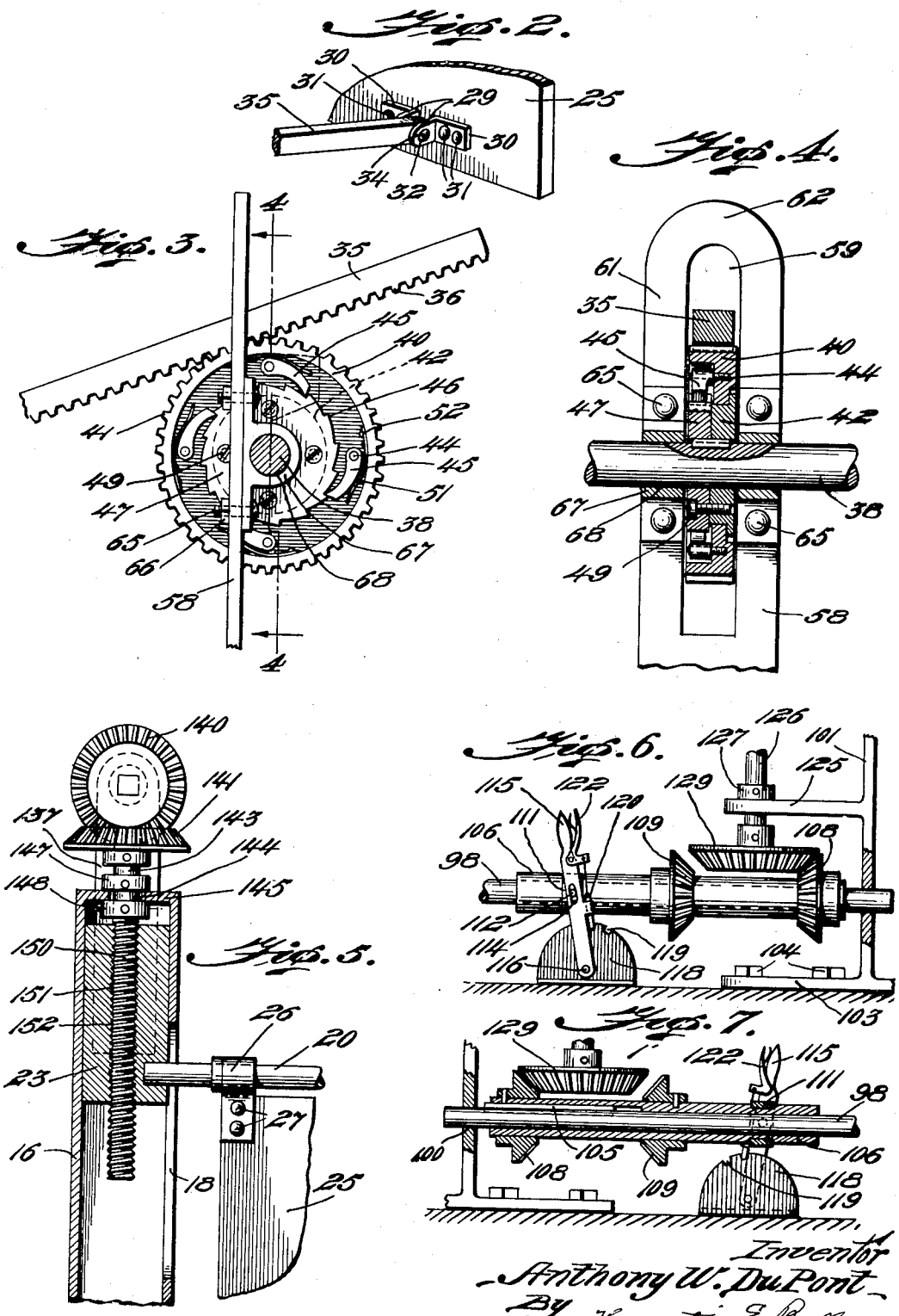
Inventor
Anthony W. Du Pont
By Horatio E. Bellows
Attorney Patented May 29, 1934

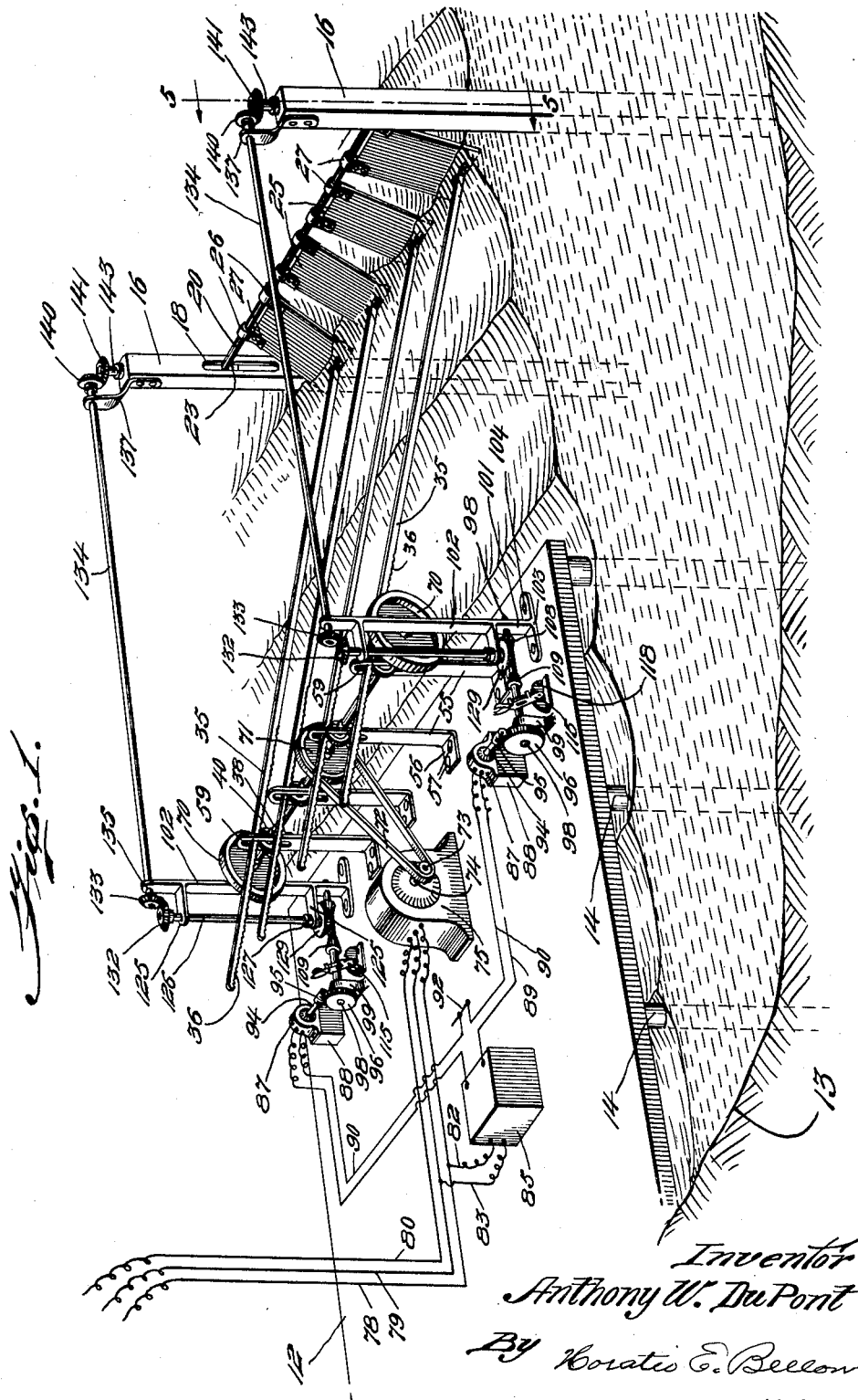

1,960,622

UNITED STATES PATENT OFFICE 1,960,622

WAVE POWER PLANT

Anthony W. Du Pont, Bristol, R. I.

Application February 28, 1933, Serial No. 658,888

2 Claims. (Cl. 253—6)

My invention relates to apparatus to convert the force of sea waves into power utilizable for mechanical purposes.

Important objects of my invention are to insure a maximum utilization of the wave force; certainty of action of the operative parts; and simplicity of construction.

Further essential objects of this invention are to provide means for elevating and depressing the wave contacting units with the rise and fall of the tides; and to actuate said means by the power furnished by the generating mechanism.

With the above and other objects and advantageous features in view, my invention consists of a novel arrangement of parts more fully disclosed in the detailed description following when considered in conjunction with the accompanying drawings, and more specifically defined in the claims appended thereto.

In the accompanying drawings which form a part of this specification,

Figure 1 is a perspective view of my wave power plant,

Figure 2, a fragmentary view of the lower portion of a paddle,

Figure 3, a detail view of a ratchet wheel the adjacent parts being fragmentarily shown, Figure 4, a section taken on line 4—4 of Figure 3, Figure 5, a section taken on line 5—5 of Figure 1, Figure 6, a side elevation of the reversing mechanism, and Figure 7, a partial central longitudinal section of the same as viewed from the side opposite that shown in Figure 6.

Similar reference characters indicate like parts throughout the views.

The wave motor mechanism of my power plant is herein illustrated in conjunction with a pier or platform 12 extending from the shore 13 and supported by piles 14. Interspaced from each other and from the platform are two transversely rectangular posts 16 fixed in the earth and having their lower portions only submerged by the water. The inner side of each post above high tide line has a vertical oblong opening 18 to slidably admit the end of a suspension rod 20 fixed to a transversely rectangular block 23 slidable in the post.

A plurality of rectangular wave impact plates 25, in this instance four in number, are pivotally suspended at their upper ends upon the rod 20 by pairs of straps 26 loose on the latter and fixed to the plates by rivets 27 or otherwise. The lower portion of each plate has a pair of lugs 29 forwardly extending from attaching plates 30 fixed by rivets 31 to the latter, and with openings 32 to accommodate a pivot pin 34 in the rear end of a rack bar 35 provided with rack teeth 36 in its outer end portion, and adapted through a releasable driving connection to intermittently impart movement to a driving shaft 38 as the contact plate is forwardly impelled by a wave.

The driving connection includes a pinion ring 40 having teeth 41 meshing with the rack teeth 36 and rotatable on a hub 42 fast to the shaft 38. At intervals in the side of the rim 40 are pins 44 upon which are pivoted pawls 45 engageable with the teeth 46 of a ratchet disk 47 fixed by screws 49 to the hub. The pawls are inwardly pressed by flat springs 51 fixed at their ends, as at 52, to the ring 40. At each plate 25 swings forwardly the pawls 45 advance the ratchet disk 47, hub 42, and shaft 38. When the plate recedes no movement is imparted to the disk or shaft by the bar. By virtue of the described clutch mechanism a practically constant driving power is exerted upon the shaft 38 regardless of the difference in angular position of the several plates 25 at any given time.

The rack bars 35 are guarded against accidental disengagement from their respective pinion rings as follows. Four interspaced strands 55 are disposed in a row, transversely of the platform, severally opposite their respective plates 25. Each of the former comprises a foot 56 fixed to the platform by screws 57, and a flat post 58 provided in its upper portion with a vertical guide slot 59 through which the forward end of a rack bar passes, and into which its pinion ring extends. Thus are formed resultant vertical lateral guard arms 61 adjacent the sides of the ring and bar. Also is formed a cross arm 62 above the bar to prevent upward escape, and interspaced therefrom to permit the arm to assume any angular position. Thus the portions 61 and 62 constitute a guard yoke.

Attached by bolts 65 and nuts 66 to the rear of each yoke is a bearing block 67 in the bore 68 of which the shaft 38 is journaled. Upon the shaft 38 is fixed one or more balance wheels 70, and a driving wheel or pulley 71 adapted through a belt 72 or other suitable connection to communicate power for any mechanical operation. As illustrated the belt engages the head 73 of the driving shaft 74 of a dynamo 75 fast to the platform and which supplies electric current through line wires 78, 79, and 80 for power purposes.

To prevent serious interruption of the operation of that portion of my apparatus hereinabove described it is necessary that the impact plates 25 be at all times in the path of the waves, therefore means is included for automatically elevating or lowering the rod 20 with the plate 25 synchronously with the movement of the tides. This is effected as follows.

A small amount of electrical current is drawn off through wires 82 and 83, connected to wires 78 and 79 respectively, to supply a storage battery 85 to which the former wires extend. Two motors 87 mounted on bases 88 and energized by the battery are disposed upon opposite margins of the platform from each other and are connected in series with the battery by wires 89 connecting the motors directly with the latter, and by wires 90 connecting the motors with each other through a control switch 92 by which the motors may be simultaneously started.

The shaft 94 of each motor carries a worm 95 engaging a worm wheel 96 whose shaft 98 is journaled in a standard 99 with its end loose in a hole 100 in the body or post position 101 of a stand 102 whose foot 103 is fixed by screws 104 to the forward margin of the platform. Splined as at 105 to each shaft 98 is a slidable sleeve 106 to which are fixed two interspaced oppositely drivable bevel gears 108 and 109. Each sleeve has fixed thereon a ring 111 carrying a pin 112 movable in a vertical slot 114 in a hand shifting lever 115 pivoted at its lower end by a pin 116 to the center of a segment plate 118 attached to the platform and provided with segmental slots 119 to receive the usual latch 120 operated by the spring actuated bell crank lever 122 pivoted to the lever.

Journaled in bracket arms 125 upon each of the stands 102 is a vertical shaft 126 carrying near its lower end a stop collar 127 above the adjacent arm 125. Each shaft has fast to its lower end a bevel gear 129 between the gears 108 and 109 and of less diameter than the space between the latter gears, so that by swinging the lever 115 the gears 108 and 109 may be brought alternately in contact with the gear 129, whereby the direction of rotation of the latter is reversed.

A bevel gear 132 upon the upper end of each shaft 126 meshes with a like gear 133 upon the forward end of a rotatable shaft 134 journaled in an opening 135 in the top of one of the stands 102 and in a bracket 137 fast to the upper portion of one of the posts 16. A bevel gear 140 upon the rear end of each shaft 134 meshes with a bevel gear 141 upon the upper end of a vertical screw shaft 143 loose in a hole 144 in the top portion 145 of one of the posts 16. Collars 147 and 148 fixed to each shaft 143 above and below the adjacent top portions 145 assist to swivel the screw shafts in the latter. The lower portion of each shaft 143 is provided with a thread 150 loosely engaging a thread 151 in a vertical central hole 152 in the adjacent block 23.

Each block 23 is continuously, simultaneously, and uniformly moved by its respective motor 87 through its described mechanical connections. The rate of movement of the blocks corresponds with the rate of movement of the tides. At each turn of the tide during the operation of my apparatus both hand levers 115 are simultaneously shifted to reverse the direction of movement of the rod 25.

I claim:—

1. In a wave motor apparatus, hollow posts provided with lateral openings, nonrotatable suspension members slidably mounted in the posts, and provided with vertical bores having threads, a rod extending through the openings fast in the suspension members, screw shafts swivelly mounted in the tops of the posts and extending into the bores and provided with threads loosely engaging the first threads, means for rotating the screw shafts, wave impact plates pivotally suspended from the rod, rack bars pivotally connected with the plates, a revoluble power shaft, and ratchet mechanisms upon the shaft adapted to be actuated by the rack bars to impart rotary movement to the shaft.

2. In a wave motor apparatus, an electric storage battery, interspaced motors connected with the battery in electrical series, clutch shafts adjacent the motors and driven thereby, clutch sleeves slidable upon the shafts, interspaced clutch gears fixed to the sleeves, intermediate clutch gears in the path of the first gears alternately engageable with said first gears when the sleeves are shifted, hollow interspaced posts, nonrotatable suspension members slidably mounted in the posts and provided with threaded bores, screw shafts swivelly mounted in the posts and engageable with said member in the bores, means actuated by said intermediate clutch gears for rotating the screw shafts, means for shifting the clutch sleeves to reverse the direction of rotation of the screw shafts, a rod connecting the suspension members, wave impact plates pivotally suspended from the rod, rack bars pivotally connected with the plates, a revoluble power shaft, and ratchet mechanisms upon the shaft adapted to be actuated by the rack bars to impart rotary movement to the shaft.

ANTHONY W. DU PONT.